(12) United States Patent
Foerg et al.

(10) Patent No.: US 10,982,435 B2
(45) Date of Patent: Apr. 20, 2021

(54) JOINT-SEALING ELEMENT AND SEALING ARRANGEMENT WITH SUCH A JOINT-SEALING ELEMENT

(71) Applicant: Hilti Aktiengesellschaft, Schaan (LI)

(72) Inventors: Christian Foerg, Lamerdingen (DE); Bernd Grosse, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 33 days.

(21) Appl. No.: 15/547,691

(22) PCT Filed: Feb. 5, 2016

(86) PCT No.: PCT/EP2016/052448
§ 371 (c)(1),
(2) Date: Jul. 31, 2017

(87) PCT Pub. No.: WO2016/128300
PCT Pub. Date: Aug. 18, 2016

(65) Prior Publication Data
US 2018/0010333 A1  Jan. 11, 2018

(30) Foreign Application Priority Data
Feb. 13, 2015 (EP) .................................. 15155102

(51) Int. Cl.
*E04B 1/94* (2006.01)
*E04B 2/74* (2006.01)
(Continued)

(52) U.S. Cl.
CPC ................ *E04B 1/948* (2013.01); *C09J 7/26* (2018.01); *E04B 1/946* (2013.01); *E04B 1/947* (2013.01);
(Continued)

(58) Field of Classification Search
CPC ...... E04B 1/948; E04B 1/6812; E04B 2/7411; E04B 2/7457; E04B 1/941; A62C 2/065; E06B 7/231
See application file for complete search history.

(56) References Cited

U.S. PATENT DOCUMENTS 2,347,158 A   4/1944 Spraragen
2,686,747 A * 8/1954 Wurtz .................... C08J 9/06
                                                    156/78

(Continued)

FOREIGN PATENT DOCUMENTS

DE   26 45 807       3/1978
EP   2505737 A2     10/2012

OTHER PUBLICATIONS https://web.archive.org/web/20150214070426/http://lorientna.com/products/gaskets-for-fire-door-assemblies/, Feb. 14, 2015.*

(Continued)

*Primary Examiner* — Brian E Glessner
*Assistant Examiner* — Daniel J Kenny
(74) *Attorney, Agent, or Firm* — Grüneberg and Myers PLLC (57) ABSTRACT

A joint-sealing element is useful for fireproof sealing of building-structure joints, especially for fireproof sealing of a joint between a first building part and a second building part, with a carrier element and a sealing profile disposed on this carrier element, wherein the disposed sealing profile contains an intumescent material.

17 Claims, 7 Drawing Sheets

(51) Int. Cl.
*C09J 7/26* (2018.01)
*E04B 1/68* (2006.01)
*C09K 21/14* (2006.01)

(52) U.S. Cl.
CPC ......... *E04B 2/7411* (2013.01); *C09J 2400/24* (2013.01); *C09J 2421/006* (2013.01); *C09J 2475/006* (2013.01); *C09K 21/14* (2013.01); *E04B 1/6812* (2013.01); *E04B 1/6813* (2013.01); *E04B 2/7457* (2013.01)

(56) References Cited

U.S. PATENT DOCUMENTS

| | | | | |
|---|---|---|---|---|
| 3,041,682 | A * | 7/1962 | Alderfer | E06B 7/231 |
| | | | | 428/129 |
| 3,566,541 | A * | 3/1971 | Coulter | E04B 1/948 |
| | | | | 49/467 |
| 3,786,604 | A * | 1/1974 | Kramer | E04B 1/6801 |
| | | | | 52/232 |
| 4,084,348 | A * | 4/1978 | Nast | E06B 7/231 |
| | | | | 428/129 |
| 5,765,332 | A | 6/1998 | Landin et al. | |
| 7,240,905 | B1 | 7/2007 | Stahl, Sr. | |
| 8,397,470 | B2 * | 3/2013 | Summons | E04D 12/00 |
| | | | | 52/272 |
| 8,584,415 | B2 * | 11/2013 | Stahl, Jr. | E04B 1/948 |
| | | | | 52/232 |
| 8,640,415 | B2 * | 2/2014 | Pilz | E04B 2/7411 |
| | | | | 52/232 |
| 8,793,947 | B2 * | 8/2014 | Pilz | E04B 2/7457 |
| | | | | 52/232 |
| 9,512,614 | B2 * | 12/2016 | Klein | E04B 2/7411 |
| 2008/0197675 | A1 * | 8/2008 | Nolles | B60J 10/22 |
| | | | | 296/215 |
| 2011/0011019 | A1 | 1/2011 | Stahl, Jr. et al. | |
| 2011/0113709 | A1 | 5/2011 | Pilz et al. | |
| 2013/0091790 | A1 | 4/2013 | Stahl, Jr. et al. | |
| 2014/0260017 | A1 * | 9/2014 | Noble, III | E06B 5/164 |
| | | | | 52/232 |

OTHER PUBLICATIONS

International Search Report dated Apr. 20, 2016, in PCT/EP2016/052448, filed Feb. 5, 2016.

* cited by examiner

JOINT-SEALING ELEMENT AND SEALING ARRANGEMENT WITH SUCH A JOINT-SEALING ELEMENT

FIELD OF THE INVENTION

The present invention relates to a joint-sealing element for fireproof sealing of joints on a building construction and/or on a building structure, especially for sealing against fire and smoke. In particular, the invention relates to smoke proof and/or fireproof sealing of connecting joints in drywalls, especially of expansion joints as visible joints.

BACKGROUND OF THE INVENTION

Connecting joints are usually formed when different building parts meet. Connecting joints are found in the region of connection to the inter-story ceiling, to the floor and to massive walls. Due to weight loading and/or thermal influences, the ceiling in buildings may be forced upward or downward. To prevent damage to the drywall, the upper connecting joint in this case is made as an expansion joint. Thus joints for creating discontinuities in building parts in order to prevent stress cracking are known as expansion joints. The ceiling profile is made in such a way that a relative movement between ceiling profile and the vertical wall components is possible.

Furthermore, optical requirements are imposed on this connecting joint, since the joint is intended to remain visible after completion of the building construction and/or of the building structure and to complete the architectural building style with integrated fire-protection requirements.

In general, a channel profile, which is part of the studwork, is fastened to the connection building parts of the building construction and/or of the building structure. The gypsum boards themselves are attached at a well-defined spacing to the connecting building part. Usually sealing of the system is provided in the gap between gypsum board and ceiling. For this purpose, either a suitable sealing compound is introduced or else the gap is filled with mineral wool and provided at the surface with a sealing layer. In both cases, the material present in the joint presents relatively strong resistance to movement, with the consequence that comparatively large joint widths are necessary in order to achieve adequate movement absorption.

In particular, sealing of the gap with sealing compound has some disadvantages. It is particularly laborious, and in the course of time the sealing tends to crack when overloaded. Furthermore, sealing can be performed only after the gypsum boards have been mounted, and it requires access to the finished drywall from both sides. Furthermore, this procedure is error-prone, since the user himself or herself must dose the correct quantity of material in order to seal the gap adequately. Above and beyond this, the drywall builder must make the width of the joint correspond to the material and expansion properties of the sealing compound. During installation of the sealing compound, nothing but the joint can be filled. During expansion of the gap, it must be ensured that the sealing compound adheres sufficiently strongly to the underlying surface and that it is able to absorb the tensile forces that develop. Frequently this not the case, and the danger exists that the sealing compound will become detached from the underlying surface or that the sealing compound itself will be overloaded and tear. In the case of a narrower gap, the sealing compound can be compressed to only a limited extent, because of its material properties, and the danger exists that it will be forced out of the gap if the joint is incorrectly dimensioned. Due to the limited expansion and compression capability of the sealing compound (max. +/−25%), it is very important to ensure adequately large dimensioning of the spacing between gypsum board and ceiling. This is frequently underestimated, and so adequate imperviousness often cannot be guaranteed during use of customary sealing compounds.

Some further approaches exist for sealing of joints, especially joint cords or joint sprays, which to some extent suffer from the same disadvantages as have been described for sealing compounds.

U.S. Pat. No. 7,240,905 B1 describes a movable joint-sealing element, but this is not suitable for fireproof sealing of a connecting joint. U.S. 2013/0091790 A1 describes a joint-sealing element that is fastened between channel profile and gypsum board, but due to the geometric configuration and complex mounting is not suitable for application in a visible joint. U.S. Pat. No. 7,654,049 B2 describes a plastic profile as a cover trim for a ceiling joint, but without fire-protection function. Furthermore, prefabricated solutions exist for fireproof sealing of connecting joints, for example in the form of dry-construction profiles with adhesively bonded intumescent tapes or in the form of intumescent strips, which are laid on the profile. A disadvantage in the use of joint-sealing elements of intumescent materials is that the polymer is influenced in ways that depend on the additives. Accordingly, changes occur in the color and elasticity of the base material. In the case of cover trims, a second product, such as, for example, a fireproof sealing compound, must be further additionally installed for the fire-protection function.

However, all of the systems mentioned above have the disadvantage that they can be used only for fireproof sealing of a connecting joint or only as a visible joint. None of the systems known from the prior art provides a joint-sealing element as a perfect visible joint that is suitable for absorbing movement and has an additional fire-protection function, and that in addition is easier and safer to use, simplifies the mounting of further building parts, ensures good sealing as soon as it is applied and ensures excellent imperviousness with maximum absorption of movement.

The object of the invention is therefore to provide a joint-sealing element that avoids the disadvantages of the known systems, that in particular is easier and safer to use, simplifies the mounting of further building parts, ensures good sealing as soon as it is applied and ensures excellent imperviousness with maximum absorption of movement, and at the same time completes the architectural building style as a visible joint with integrated fire-protection requirements. In particular, it is an object of the present invention to provide a joint-sealing element which is suitable for fireproof sealing of a joint on a building construction and/or on a building structure, especially for fireproof sealing of a joint between a first building part and a second building part, which can be readily compressed and deformed, with which improved evening out of irregularities, improved installation, and improved sealing can be achieved and which functions at the same time as a visible joint.

A further object of the present invention is to provide a method for fireproof sealing of a joint, which can be accomplished simply, is reliable with little work effort and leads without defects to sealing of a joint, especially a visible joint, between two juxtaposed building parts of a building construction and/or of a building structure.

Yet another object of the present invention is to provide an arrangement which, in the event of fire, permits better sealing of a joint, such as a visible joint, between two building parts, especially between a drywall and a connecting building part, such as a wall, a ceiling or a floor, and thus provides better and durable sealing against smoke and better and durable fire protection, and can be mounted reliably and free of defects with little work effort.

This and further objects that will become apparent from the description of the invention hereinafter are solved by the present invention, as described in the independent claims. The dependent claims relate to preferred embodiments.

SUMMARY OF THE INVENTION

The present invention relates to a joint-sealing element for fireproof sealing of a joint on a building construction and/or on a building structure, especially for fireproof sealing of a joint between a first building part and a second building part, with a carrier element and a sealing profile disposed on this carrier element, wherein the disposed sealing profile comprises an intumescent material. Preferably, the sealing profile is disposed on the outer periphery of the carrier element.

The present invention further relates to a method for fireproof sealing of a joint between two juxtaposed building parts of a building construction and/or of a building structure with at least one first building part, one second building part and the inventive joint-sealing element.

The present invention further relates to a sealing arrangement for fireproof sealing of a joint between two juxtaposed building parts of a building construction and/or of a building structure with at least one first building part, one second building part and the joint-sealing element described in the foregoing, wherein the sealing profile is positioned in the outer region of the joint and is configured to seal the joint from the outside.

Some other objects and features of this invention are obvious and some will be explained hereinafter. In particular, the subject matter of the present invention will be described in detail by reference to the following figures:

DETAILED DESCRIPTION OF THE INVENTION

The following terms are used within the scope of the present invention:

Within the scope of the present invention, the term "geometry/geometries" comprises various cross-section types and cross-section shapes. This means that the sealing profile in particular may have different cross-section types and cross-section shapes. Cross-section types are understood among other possibilities as round profile (round cross section), oval profile (oval cross section), wedge profile (wedge-shaped cross section), polygonal profile (polygonal cross section), especially square profile (square cross section), rectangular profile (rectangular cross section), parallelogram profile (cross section in the shape of a parallelogram), triangular profile (triangular cross section), etc. Cross-sectional shapes are understood among other possibilities as solid profile and hollow profile, wherein solid profile means that the sealing profile consists completely of sealing material while the hollow profile means that the sealing profile consists only partly of sealing material.

Within the scope of the present invention, the term "deformable" means that irregularities in the building part, against which the sealing profile is pressed, can be evened out. In this connection, "plastically deformable" means that the sealing profile is deformable and no longer returns to its original shape after deformation. Analogously, "elastically deformable" means that the sealing profile is deformable and returns to its original shape after deformation, i.e. the material can be deformed reversibly to a certain extent.

The terms "exhibit", "with" and "have" are intended to be inclusive and mean that elements other than those cited may also be meant.

Within the scope of the present invention, the term "intumescence" means that, under the effect of heat, for example in the event of a fire, the material swells and forms an insulating layer of flame-retardant material, i.e. intumesces.

Within the scope of the present invention, "slow-burning foam" is understood as a foam that offers no possibility of fire propagation due to the foam, is not spontaneously flammable and also does not drip.

"Positioned in the outer region of the joint" means that the sealing profile is disposed, especially laterally, on an upper end edge of the first building part, preferably a drywall.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

In one aspect, the present invention relates to a joint-sealing element for fireproof sealing of a joint on a building construction and/or on a building structure, especially for fireproof sealing of a joint between a first building part and a second building part, wherein the joint-sealing element comprises a carrier element and a sealing profile disposed on this carrier element and is characterized in that the disposed sealing profile comprises an intumescent material.

In a further aspect, the present invention relates to a method for fireproof sealing of a joint between two juxtaposed building parts of a building construction and/or of a building structure with at least one first building part, one second building part and the inventive joint-sealing element.

In a further aspect, the present invention relates to a sealing arrangement for fireproof sealing of a joint between two juxtaposed building parts of a building construction and/or of a building structure with at least one first building part, one second building part and the inventive joint-sealing element, wherein the sealing profile is positioned in the outer region of the joint and is configured to seal the joint from the outside.

It has been discovered that the inventive joint-sealing element is particularly suitable for safely sealing, in simple manner, a building-structure joint between two adjoining building parts, especially against smoke and fire, and at the same time, as a visible joint, it completes the architectural building style with integrated fire-protection requirements. For the joint-sealing element to be able to fulfill its function, the sealing profile of the joint-sealing element must have a predetermined geometry and comprise an intumescent material. Furthermore, the joint-sealing element must be positioned in the outer region of the joint and be configured such that it can seal the joint from the outside.

Therefore it is an objective of the present invention to describe the joint-sealing element. In particular, it is an objective of the present invention to describe the geometry of the sealing profile in detail. Furthermore, it is an objective of the present invention to describe the positioning of the joint-sealing element, especially a sealing arrangement as well as a method for fireproof sealing of a joint between two juxtaposed building parts of a building construction and/or of a building structure with at least one building part and one second building part.

The inventive joint-sealing element for fireproof sealing of a joint on a building construction and/or on a building structure, especially for fireproof sealing of a joint between a first building part and a second building part, wherein the joint-sealing element comprises a carrier element and a sealing profile disposed on this carrier element, is characterized in that the disposed sealing profile comprises an intumescent material. Preferably, the sealing profile is disposed on the outer periphery of the carrier element. Furthermore, the inventive joint-sealing element has a predetermined geometry. As already mentioned hereinabove, geometries within the scope of the present invention comprise various cross-section types and cross-section shapes.

Preferred cross-section types of the sealing profile of the joint-sealing element according to the present invention are solid profiles and if necessary hollow profiles, wherein the hollow profile may be a closed or open hollow profile. Solid profiles and hollow profiles with large profile wall thicknesses have the advantage that automatically no gaps develop at the abutting surface between two sealing profiles in contact with one another. Hollow profiles can be compressed to a greater extent and thus absorb more movement. Particularly preferably, the sealing profile has a solid profile. Also preferably, the sealing profile comprises a sealing lip, which is provided with an intumescent material.

Preferred cross-section shapes of the sealing profile of the joint-sealing element according to the present invention are round profile, oval profile, wedge profile, polygonal profile, especially rectangular profile, square profile, parallelogram profile and triangular profile. Round profile and oval profile are particularly preferred, but round profile is the most preferred. Nevertheless, other or mixed cross-section shapes are also conceivable and possible, as long as the joint-sealing element adjoins both building parts after installation of the sealing profile and is able to seal the joint that is present between the building parts.

In a preferred embodiment of the inventive joint-sealing element, the sealing profile has a round profile.

In a further preferred embodiment of the inventive joint-sealing element, the sealing profile has an oval profile.

In a particularly preferred embodiment of the inventive joint-sealing element, the sealing profile has a solid profile and a round profile.

In a further particularly preferred embodiment of the inventive joint-sealing element, the sealing profile has a solid profile and an oval profile.

In an alternative embodiment of the inventive joint-sealing element, the sealing profile comprises a sealing lip, which is provided with an intumescent material or consists of an intumescent material.

The geometry of the sealing profile may be prefabricated, for example by well-defined cutting to size, extrusion or pressing of suitable sealing material. Prefabrication directly from flat material is also possible, for example by means of folding or rolling from a flat starting material, such as, for example, plastic, plastic film, fabric, a nonwoven or the like. The manufacture of such cross-section types and cross-section shapes is known to the person skilled in the art. Preferably the geometry of the sealing profile is prefabricated by well-defined cutting to size or extrusion.

The inventive sealing profile may consist of one piece made from one material or of multiple parts made from several materials and, for example, may exist as a layered body. In alternative embodiments, the outer region and the inner region of a sealing profile may define separate regions of the sealing profile, which may have different cross-section shapes and/or cross-section types and/or may consist of different materials.

According to the invention, the sealing profile consists of a deformable material. This material may be either plastically or elastically deformable. In particular, the sealing profile consists at least partly, preferably completely of a material that is resilient after compression, such as, for example, foam, sponge rubber, cellular rubber or the like. Preferably the deformable material is a slow-burning foam, a plastic, a plastic film, a fabric, a nonwoven or the like. In particular, the inventive sealing profile consists of a soft foam, that is resilient after compression. Common foams such as polyethylene and polyurethane foams or cellular rubber can be mentioned as foam material. This foam may be an open-celled foam with very low air passage resistance, or else an approximately closed-celled foam with extremely low air permeability values. Even foams with air permeability values lying between the two extreme cases mentioned in the foregoing may be used within the scope of the present invention. The foam may be impregnated with an impregnating agent that increases the sealing properties of the foam. In order to achieve imperviousness to smoke, at least the outer surface of the sealing profile must be of closed-pore nature. Alternatively, an open-celled sealing profile with a cover layer or jacket, for example of a film, especially plastic film, may be provided. Preferably, the sealing profile consists of an open-celled polyurethane foam or of a cellular rubber.

It has proved advantageous when the sealing profile consists of a slow-burning foam, such as a cellular rubber or polyurethane foam, for example. In the case of a slow-burning foam, there is no possibility that fire will be propagated by the foam. Spontaneous inflammation is ruled out by the above-mentioned foam-type starting materials. It is also advantageous that no dripping occurs in the event of fire. A slow-burning foam should still have at least 20%, still at least 25%, preferably still at least 30%, between 20% and 60%, between 20% and 40%, preferably between 25% and 30% of its initial volume in a temperature range between 500° C. and 800° C. Furthermore, a slow-burning foam should still have at least 10%, at least 20%, preferably still at least 30%, between 10% and 40%, between 10% and 30%, preferably between 15% and 20% of its initial mass in a temperature range between 500° C. and 800° C.

Furthermore, the material contains appropriate additives for fire-protection properties, such as intumescence, for example. Under the effect of heat, such as in the event of fire, the material swells and forms an insulating layer of flame-retardant material. The formation of a voluminous insulating layer, namely an ash layer, may take place due to the chemical reaction of a mixture of compounds that are appropriately matched to one another and that react with one another under the effect of heat. Such systems are known to the person skilled in the art as chemical intumescence, and they are used according to the invention. Alternatively, the voluminous insulating layer may be formed by swelling of an individual compound, which releases gases under the effect of heat, even though no chemical reaction has occurred between two compounds. Such systems are known to the person skilled in the art as physical intumescence, and they are used according to the invention. According to the invention, the two systems may be used respectively alone or together as a combination.

According to the present invention, the sealing profile comprises an intumescent material. Preferably the intumescent material is an intumescent foam, an intumescent coating or an intumescent strip. Particularly preferably, the intumescent material is an intumescent foam.

In a preferred embodiment of the inventive joint-sealing element, the sealing profile consists of an open-celled intumescent foam.

In a further preferred embodiment of the inventive joint-sealing element, the sealing profile consists of a closed-celled intumescent foam.

In a particularly preferred embodiment of the inventive joint-sealing element, the sealing profile consists of an open-celled intumescent polyurethane foam.

In a further particularly preferred embodiment of the inventive joint-sealing element, the sealing profile consists of an intumescent cellular rubber.

The carrier element of the inventive joint-sealing element may consist of a deformable material, which may be the same as that of the sealing profile, of a film, for example of a plastic film, of a fabric, especially of a noncombustible material, such as inorganic fibers, for example glass fibers, a nonwoven or the like. Preferably the carrier element consists of a plastic, of a plastic film, of a fabric, of a nonwoven, of a metal, of a composite material or the like, preferably of plastic. Most preferably, the carrier element consists of polyvinyl chloride.

The carrier element may be made in one piece from one material or in multiple pieces, even from different materials. Preferably the carrier element is made in one piece.

The inventive joint-sealing element may be made in one piece from one material or in multiple pieces, even from different materials. Preferably the joint-sealing element consists of several units/materials. Particularly preferably, the sealing profile consists of deformable material and the carrier element of plastic.

In one embodiment of the inventive joint-sealing element, the sealing profile is firmly surrounded at least over part of its circumference by a covering layer or jacket, for example of a film, especially plastic film. Thus an open-celled foam material may be used for the sealing profile.

In a further embodiment of the inventive joint-sealing element, the sealing profile is firmly bonded at least over part of its circumference with the carrier element. Hereby a firm connection is created between the carrier element and the sealing profile, so that even if the fastening region is exposed to strong stress and strain and the sealing profile becomes partly detached from the carrier element, complete separation of the sealing profile from the carrier element is prevented.

In a further embodiment of the inventive joint-sealing element, the sealing profile is firmly bonded over its entire circumference with the carrier element. On the one hand, optimum and durable fastening of the sealing profile to the carrier element is achieved hereby, making separation of the sealing profile from the carrier element almost impossible. On the other hand, when the carrier layer is impermeable to smoke gas, an open-celled foam material may be used for the sealing profile.

Preferably the sealing profile is disposed on the carrier element; more preferably the sealing profile is disposed on the outer periphery of the carrier element.

The joint-sealing element of the present invention, especially the carrier element of the joint-sealing element, preferably has at least one fastening region oriented in the direction of the longitudinal extent of the joint for fastening of the joint-sealing element on a construction element of the building construction and/or of the building structure disposed peripherally on the joint. Preferably the at least one fastening region of the joint-sealing element is textured, perforated or provided with holes. Particularly preferably, the at least one fastening region of the joint-sealing element is provided with holes. The holes serve for fastening of the joint-sealing element by means of gypsum filler to the upper, outer end edge of the first building part, especially a gypsum board.

If necessary, the joint-sealing element of the present invention comprises a positioning and/or fastening aid in the form of a lamella, a nose, an edge, a beading, an angle and a hook. This positioning and/or fastening aid serves for neat positioning and fastening of the joint-sealing element and, after being filled, for example with gypsum, can be separated without leaving residues after completion of installation. Preferably the joint-sealing element of the present invention has a separable filler-guiding edge, which preferably is attached in the region of the bond between carrier element and sealing profile. Such a filler-guiding edge facilitates mounting and permits neat sealing of the connecting joint, in order to provide a visible joint with fire-protection function. Such a positioning and/or fastening aid may consist of a plastic, a plastic film, a metal, a fabric, a nonwoven, or the like. Preferably the filler-guiding edge consists of plastic.

The inventive method for fireproof sealing of a joint between two juxtaposed building parts of a building construction and/or of a building structure with at least one first building part, one second building part and the inventive joint-sealing element is characterized in that, in a first step, the joint-sealing element is positioned on an end edge of the first building part, especially a drywall, preferably a gypsum board and, in a second step, is fastened. Preferably the first step comprises positioning by adhesives, screws, dowels, clamps and nails. In particular, the carrier element can be positioned flush on the upper, outwardly facing, horizontal end edge of a gypsum board. Positioning of the joint-sealing element on the first building part may also be achieved by fastening means, for example in the form of an adhesive layer, especially a self-adhesive layer, in the form of interlocking or frictionally acting means, such as suitable profiled shapes or putty material, by means of a separately applicable adhesive or the like. Positioning of the inventive joint-sealing element may be applied over an area or only at spots. Preferably the second step comprises fastening by filling, especially by means of gypsum filler.

The dimension and the materials of the joint-sealing element are chosen to correspond to the planned use of the joint-sealing element.

In general, the dimension of the joint-sealing element is chosen as a function of the profiles being used and of the material being used. The dimension must be chosen such that the joint-sealing element fills the gap between the gypsum board and the ceiling and bears sealingly both on the ceiling and on the gypsum board. If a vertical movement of the gypsum boards is to be permitted, the joint-sealing element must follow the movement of the gypsum board, to ensure that the contact with the gypsum board is not torn apart and that no spaces can develop between joint-sealing element and gypsum board. For this purpose, the sealing profile of the joint-sealing element preferably consists of resilient and compressible material and is appropriately precompressed during mounting, so that a downward movement of the gypsum board, whereby the gap between this and the ceiling becomes larger, can be followed. In this way, the preadjusted freedom of movement of the gypsum board determines the dimension of the sealing profile and thus of the joint-sealing element.

As an example, it must be pointed out that the height of the sealing profile will be chosen as a function of the desired use of the joint-sealing element, in which case the height for a single-boarded arrangement will be chosen as approximately the thickness of one gypsum board and the height for a double-boarded arrangement will be chosen as approximately twice the thickness of one gypsum board. In the case of a single-boarded arrangement, however, it is also possible to use the joint-sealing element designed for the double-boarded arrangement.

As an example, it must also be pointed out that material and geometry of the sealing profile may be chosen in such a way for floor application that its hardness or compressibility is adjusted such that the sealing profile is compressed to a well-defined height merely by the dead weight of the gypsum board in the floor region, for example by constructing the sealing profile as two layers of foam materials with different compression density. In this way a correct spacing between floor and gypsum board can be adjusted without further measurement. This is necessary in particular whenever damage to the gypsum board by rising dampness must be prevented.

The invention will be described in more detail hereinafter on the basis of application of the joint-sealing element on a drywall of a sealing arrangement for a drywall studwork, without restricting the scope of protection hereby.

To establish an inventive sealing arrangement for fireproof sealing of a joint between two juxtaposed building parts of a building construction and/or of a building structure with at least one first building part, one second building part and the inventive joint-sealing element, the sealing profile is positioned in the outer region of the joint, preferably on the first building part, and is configured to seal the joint from outside.

Preferably the carrier element is disposed on the upper periphery of the outside of the first building part, especially on the upper end edge of the outside of the first building part. Preferably the carrier element can be positioned flush and fastened on the upper, outwardly facing, horizontal end edge of a gypsum board.

According to the present invention, the first building part is preferably a drywall, preferably a gypsum board, and the second building part is a wall, a ceiling or a floor, preferably a ceiling, of a building construction and/or of a building structure.

According to the present invention, the inventive joint-sealing element is positioned and fastened after the drywall studwork has been finished, in order to create a visible joint with additional fire-protection function in this way. In this arrangement, the joint-sealing element is positioned in the outer region of the joint and is configured to seal the joint in fire-protection manner from the outside. In this arrangement of the joint-sealing element, irregularities in all building parts can be evened out.

According to the invention, the joint-sealing element can be applied on all kinds of connecting joints in which one building part meets another building part. Accordingly, the joint-sealing element can be applied on all profiles, even closed profiles or wooden beams, which must be sealed at a connecting face.

A particularly preferred application of the joint-sealing element relates to sealing the profiles in dry construction, wherein the first building part is a drywall, for example one or more gypsum boards, and the second building part is a wall, a ceiling or a floor of a building element, for example a masonry structure or concrete building element. A further building part is a profile for positioning and fastening of the gypsum board, wherein it may be any of the profiles commonly used for dry construction, regardless of whether it has a slotted or non-slotted web or slotted or non-slotted flanges. In order to permit vertical movement of the gypsum boards, for example in the event of an earthquake, the gypsum boards are mounted to be vertically movable at a spacing from a wall, a floor or a ceiling. Thereby a space (also referred to as joint herein) is formed between the gypsum board and the wall, the floor or the ceiling. This joint is filled by the sealing profile of the joint-sealing element, so that the sealing profile seals the joint against smoke and fire.

Without restricting the scope of protection of the invention, the invention will be described in more detail on the basis of special embodiments of the joint-sealing element as well as its positioning. In these embodiments, the joint-sealing element is applied to the connecting joints in drywalls. It is clear to the person skilled in the art that the joint-sealing element may also be applied to building-structure joints of other types.

Figure 1:
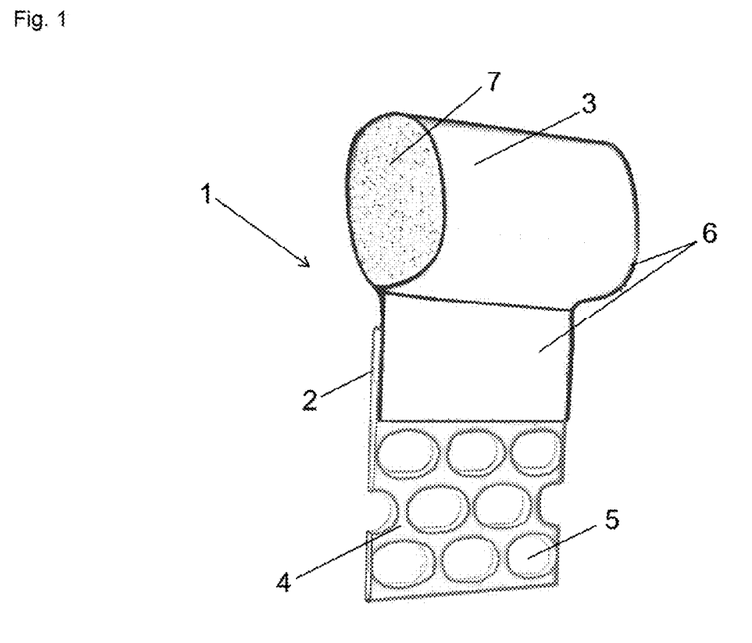
FIG. 1 shows a sketched perspective view of a joint-sealing element according to one embodiment of the present invention, wherein the sealing profile has a solid profile and round profile and the carrier element has a fastening region.

A preferred embodiment of an inventive joint-sealing element 1 is shown in FIG. 1. Joint-sealing element 1 has a sealing profile 3, which is positioned on the outer periphery of carrier element 2. Sealing profile 3 has a round profile and a solid profile, wherein carrier element 2 is positioned longitudinally on round sealing element 3. Carrier element 2 has a fastening region 4 oriented in the direction of the longitudinal extent of the joint for fastening of joint-sealing element 1 to a construction element, disposed peripherally on the joint, of a building construction and/or of a building structure. Fastening region 4 of carrier element 2 is provided with holes 5. Furthermore, sealing profile 3 is surrounded completely, i.e. over its entire circumference, by a plastic film 6, which fastens sealing profile 3 to carrier element 2. Sealing profile 3 consists of a compressible foam 7, which contains fire-protection additives, and carrier element 2 consists of plastic.

Figure 2:
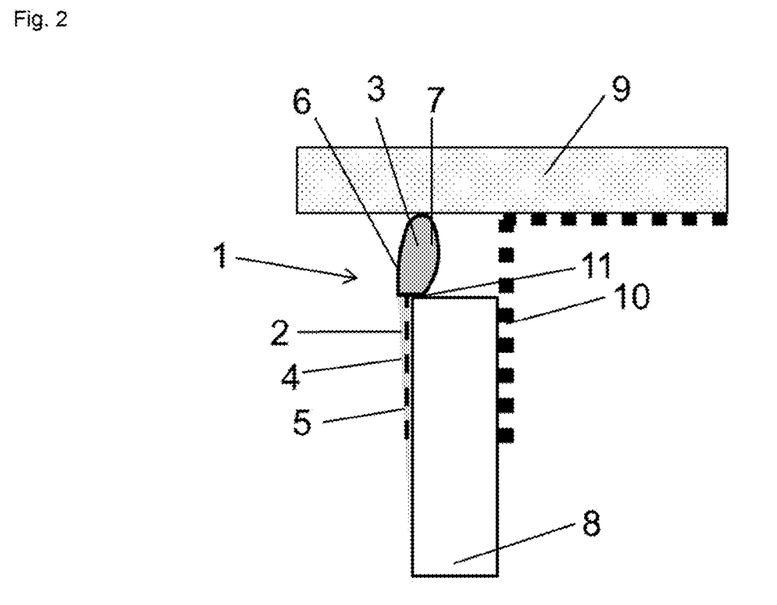
FIG. 2 shows a sketched sealing arrangement with a joint-sealing element according to one embodiment of the present invention, wherein the sealing profile has a solid profile and oval profile.

FIG. 2 shows a sealing arrangement with a joint-sealing element 1 according to one embodiment of the present invention. In particular, FIG. 2 shows the positioning of an embodiment of the inventive joint-sealing element 1 in a connecting joint of drywalls with a single-boarded arrangement. The sealing arrangement in FIG. 2 for fireproof sealing of a joint between two juxtaposed building parts of a building construction and/or of a building structure with at least one first building part 8, one second building part 9 and a joint-sealing element 1 shows that sealing profile 3 is positioned in the outer region of the joint, on second building part 9, and is configured to seal the joint from the outside. In particular, for fireproof sealing of the gap between a ceiling 9, channel profile 10 of a drywall studwork and gypsum boards 8, joint-sealing element 1, in the first step, is positioned in the joint on end edge 11 of first building part 8 and, in a second step, is fastened, i.e. fastening region 4 is filled. Thereby sealing profile 3 seals the gap between ceiling 9 and channel profile 10 as well as the gap between ceiling 9 and gypsum board 8. Joint-sealing element 1 in FIG. 2 has a sealing profile 3, which is positioned on the outer periphery of carrier element 2. Sealing profile 3 has a solid profile and oval profile. Carrier element 2 has a fastening region 4 oriented in the direction of the longitudinal extent of the joint for fastening of joint-sealing element 1 on a construction element 8, disposed peripherally on the joint, of a building construction and/or of a building structure. Fastening region 4 of carrier element 2 is provided with holes 5. Furthermore, sealing profile 3 is surrounded completely, i.e. over its entire circumference, by a plastic film 6, which fastens sealing profile 3 to carrier element 2. Sealing profile 3 consists of a compressible, intumescent foam 7, which contains fire-protection additives, and carrier element 2 consists of plastic.

FIGS. 3 to 6 show further sealing arrangements with joint-sealing elements 1 according to various embodiments of the present invention. In particular, FIGS. 3 to 6 show positionings of various embodiments of inventive joint-sealing element 1 in connection joints in drywalls with single-boarded arrangement, similar to what was described for FIG. 2.

Figure 3:
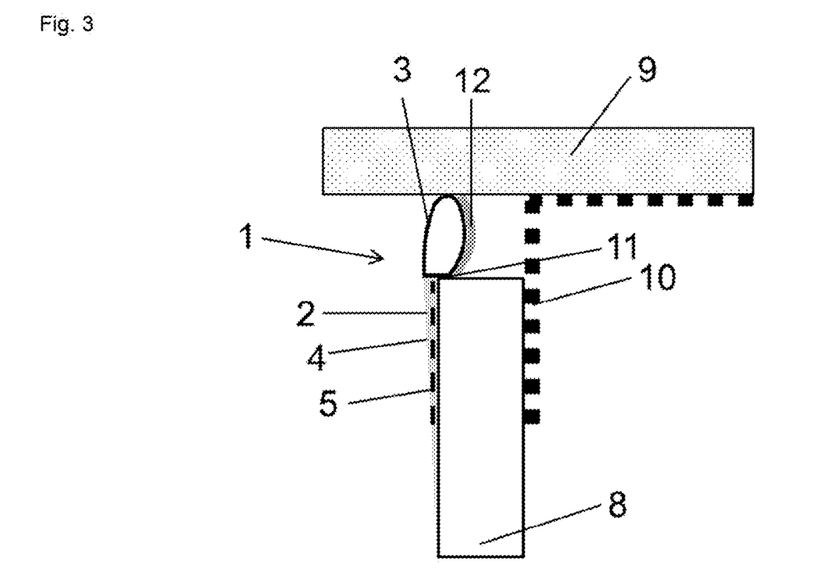
FIG. 3 shows a sketched sealing arrangement with a joint-sealing element according to one embodiment of the present invention, wherein the sealing profile has a hollow profile and oval profile with an intumescent strip.

Sealing profile 3 of joint-sealing element 1 in FIG. 3 has a hollow profile and oval profile, wherein the hollow profile is provided on the inside with an intumescent strip 12. Carrier element 2 has a fastening region 4 oriented in the direction of the longitudinal extent of the joint for fastening of joint-sealing element 1 on a construction element 8, disposed peripherally on the joint, of a building construction and/or of a building structure. Fastening region 4 of carrier element 2 is provided with holes 5. Sealing profile 3 and carrier element 2 consist of plastic, for example polyvinyl chloride.

Figure 4:
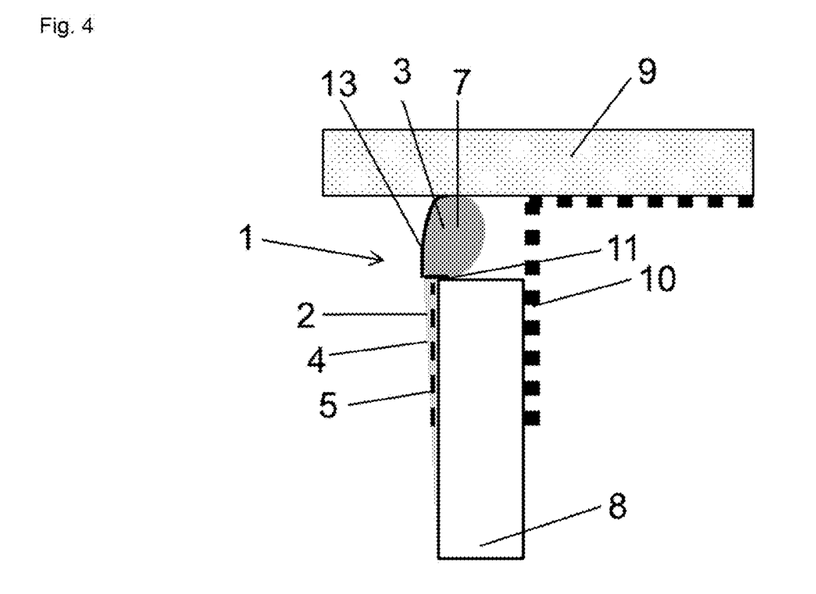
FIG. 4 shows a sketched sealing arrangement with a joint-sealing element according to one embodiment of the present invention, wherein the sealing profile comprises a sealing lip that is back-filled with intumescent material.

Sealing profile 3 of joint-sealing element 1 in FIG. 4 comprises a sealing lip 13, which is back-filled with compressible, intumescent foam 7. Carrier element 2 has a fastening region 4 oriented in the direction of the longitudinal extent of the joint for fastening of joint-sealing element 1 on a construction element 8, disposed peripherally on the joint, of a building construction and/or of a building structure. Fastening region 4 of carrier element 2 is provided with holes 5. Sealing lip 13 and carrier element 2 consist of plastic, for example polyvinyl chloride.

Figure 5:
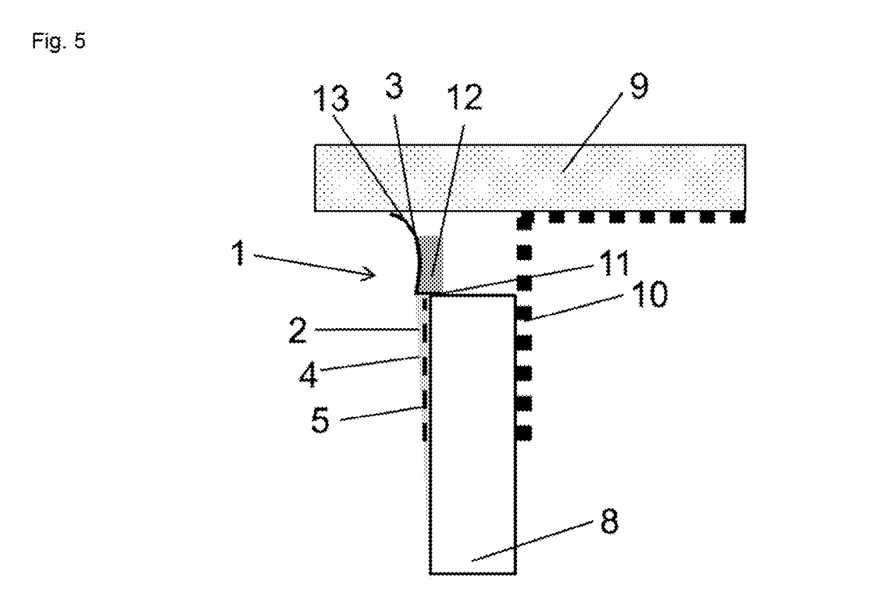
FIG. 5 shows a sketched sealing arrangement with a joint-sealing element according to one embodiment of the present invention, wherein the sealing profile comprises a sealing lip that is coated with an intumescent material.

Sealing profile 3 of joint-sealing element 1 in FIG. 5 comprises a sealing lip 13, which is coated with an intumescent strip 12. Carrier element 2 has a fastening region 4 oriented in the direction of the longitudinal extent of the joint for fastening of joint-sealing element 1 on a construction element 8, disposed peripherally on the joint, of a building construction and/or of a building structure. Fastening region 4 of carrier element 2 is provided with holes 5. Sealing lip 13 and carrier element 2 consist of plastic, for example polyvinyl chloride.

Figure 6:
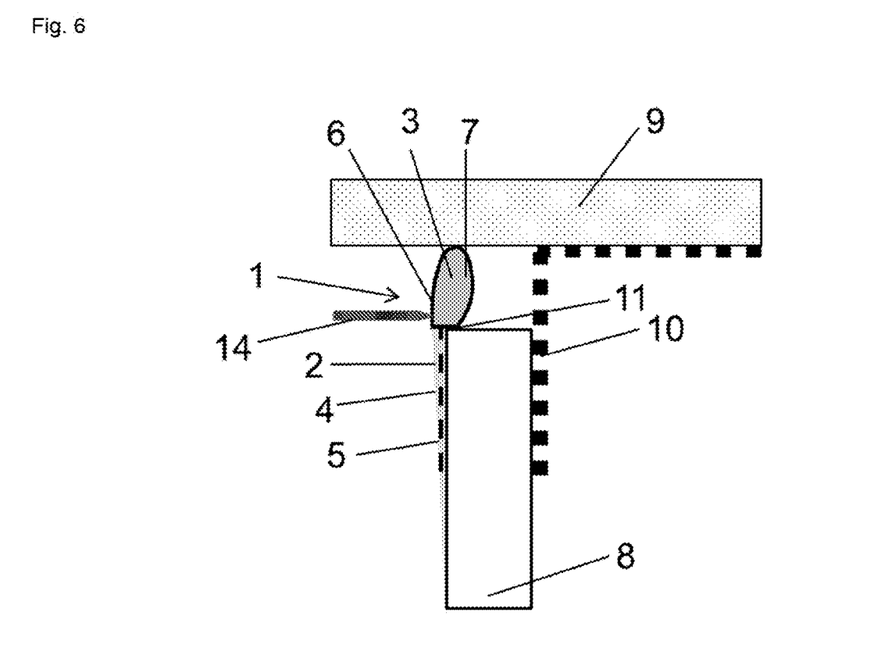
FIG. 6 shows a sketched sealing arrangement with a joint-sealing element according to one embodiment of the present invention, wherein the sealing profile has a solid profile and oval profile and is provided with a separable filler-guiding edge.

Sealing profile 3 of joint-sealing element 1 in FIG. 6 has a solid profile and oval profile, wherein joint-sealing element 1 is provided with a separable filler-guiding edge 14. Carrier element 2 has a fastening region 4 oriented in the direction of the longitudinal extent of the joint for fastening of joint-sealing element 1 on a construction element 8, disposed peripherally on the joint, of a building construction and/or of a building structure. Fastening region 4 of carrier element 2 is provided with holes 5. Sealing profile 3 consists of a compressible, intumescent foam 7, which contains fire-protection additives, and carrier element 2 consists of plastic.

Figure 7:
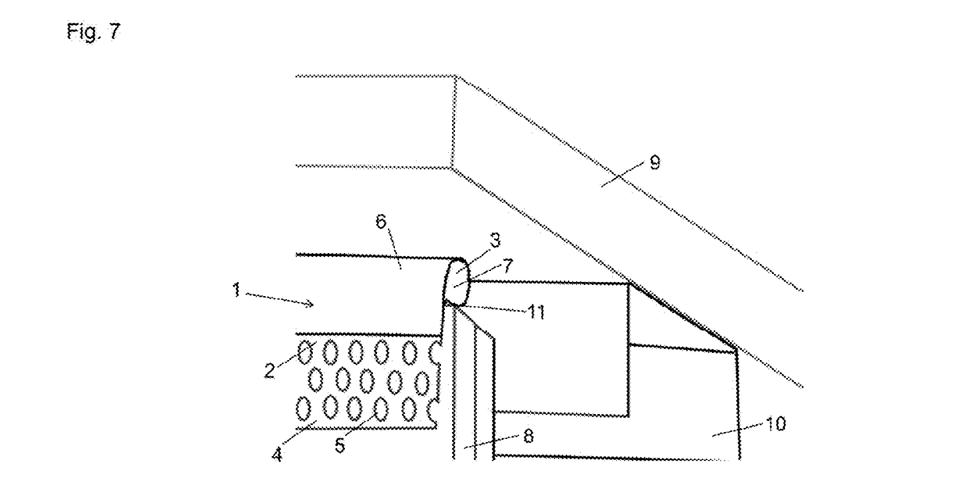
FIG. 7 shows a sketched perspective view of a sealing arrangement with the embodiment of an inventive joint-sealing element shown in FIG. 1.

FIG. 7 shows a sketched perspective view of a sealing arrangement with the embodiment of an inventive joint-sealing element 1 shown in FIG. 1.

Figure 8:
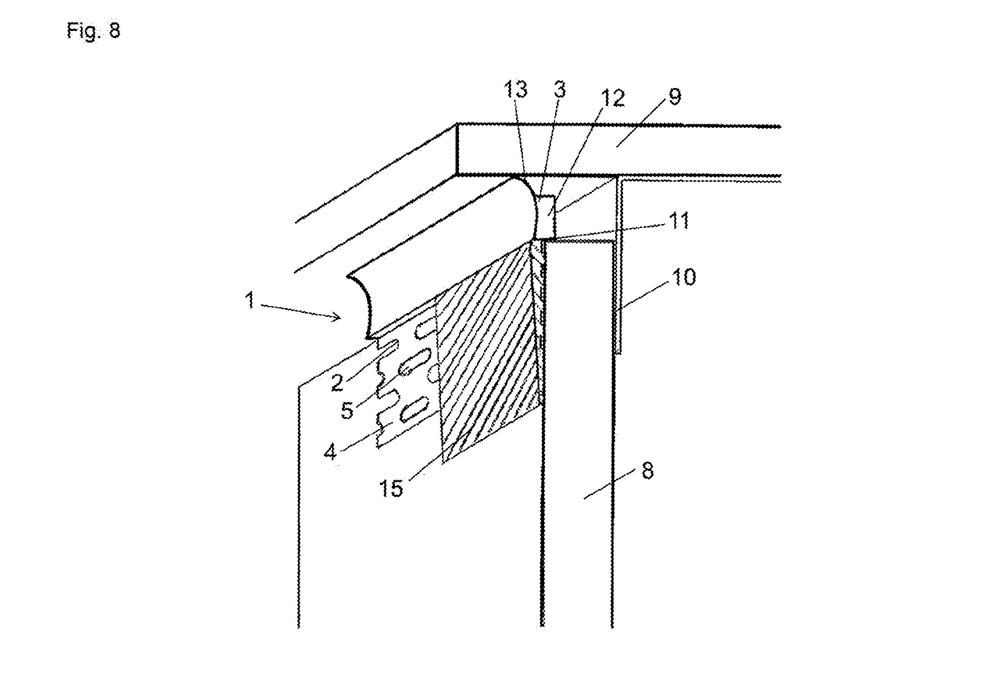
FIG. 8 shows a sketched perspective view of a sealing arrangement with the embodiment of an inventive joint-sealing element shown in FIG. 5.
Figure 9:
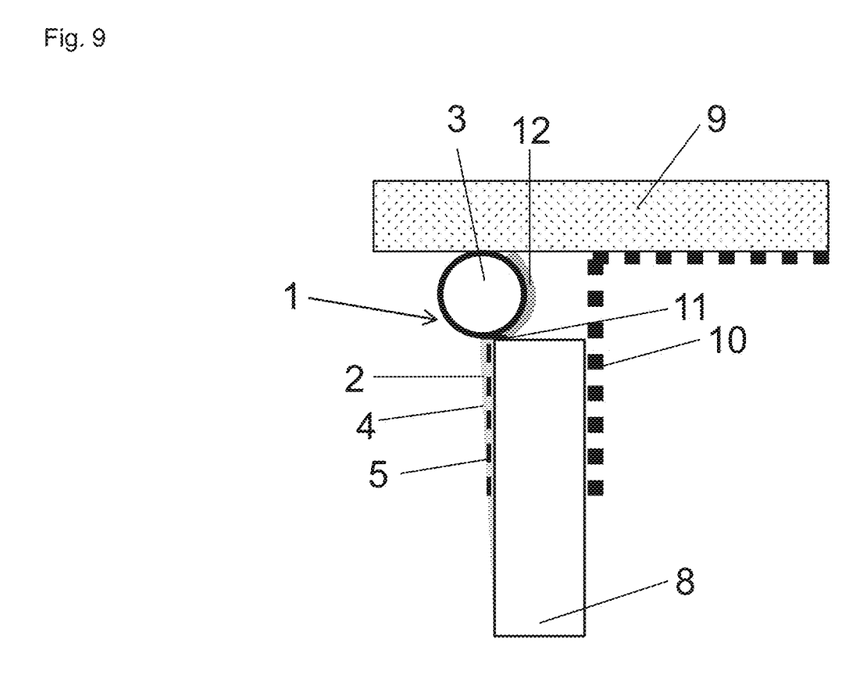
FIG. 9 shows a sketched sealing arrangement with a joint-sealing element according to one embodiment of the present invention, wherein the sealing profile has a hollow profile and a round profile with an intumescent strip.
Figure 10:
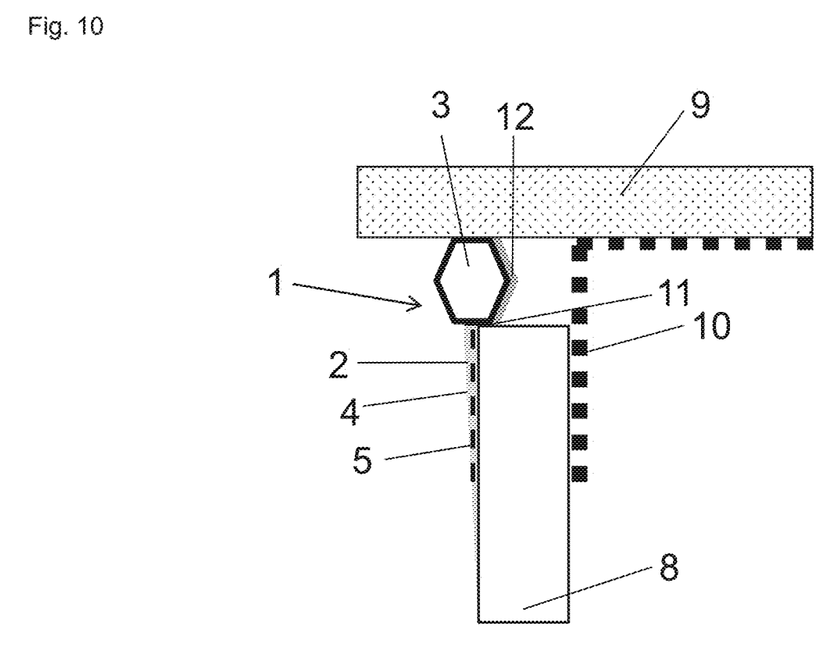
FIG. 10 shows a sketched sealing arrangement with a joint-sealing element according to one embodiment of the present invention, wherein the sealing profile has a hollow profile and an octagonal profile with an intumescent strip.
Figure 11:
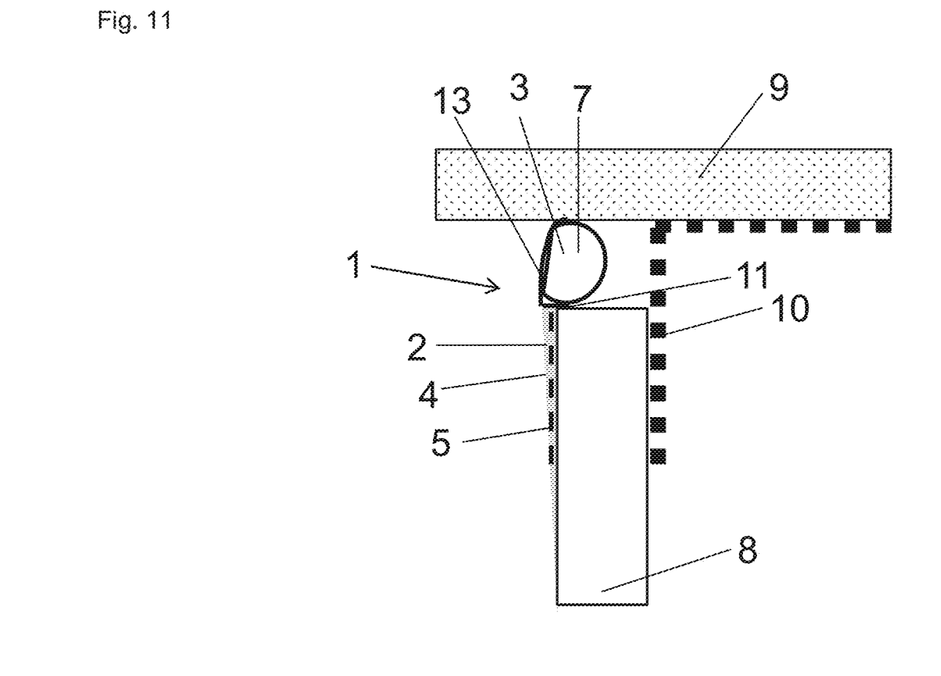
FIG. 11 shows a sketched sealing arrangement with a joint-sealing element according to one embodiment of the present invention, wherein the sealing profile comprises a sealing lip.

FIG. 8 shows a sketched perspective view of a sealing arrangement with the embodiment of an inventive joint-sealing element 1 shown in FIG. 5, with already filled region 15.

Any geometric as well as material configuration of the sealing profile and of the carrier element mentioned in the foregoing can be combined and used in any way in order to provide a joint-sealing element according to the present invention.

As is obvious from the foregoing explanations, the inventive joint-sealing element is particularly suitable for safely sealing a building-structure joint between two adjoining building parts in simple manner, especially against smoke and fire.

The joint sealing element of the present invention can be readily compressed and deformed, and thereby improved evening-out of irregularities can be achieved, as can improved installation, e.g. simple positioning and fastening, as well as improved sealing, e.g. when several joint-sealing elements are made to abut against one another. In particular, the joint-sealing element of the present invention is also able to compensate for an offset in the previously mounted gypsum boards.

The invention makes it possible to provide a joint-sealing element with fire-protection function for expansion joints and at the same time completes the architectural building style with integrated fire-protection requirements with an appealing appearance for the visible region.

The method for sealing a joint allows simple execution and, with little working effort, leads reliably and without defects to fireproof sealing of a joint between two juxtaposed building parts of a building construction and/or of a building structure. In particular, the present invention permits a one-stage installation process almost without tools, wherein fire protection and optically appealing sealing are installed in one working process. Filling is directly possible, and no additional paper or lattice strips are needed. Furthermore, even a sealing compound is not needed for the installation process. Rapid overcoating of the fastening region is accomplished easily by suitable choice of materials, resulting in an optically appealing visible joint with integrated fire-protection function. A simple inspection can be achieved by pressing the filler-guiding edge, and this also guarantees neat sealing of the visible joint.

Furthermore, it has been shown that application is very mounting-friendly, since no additional fastening of the joint-sealing element, for example to the profile or to the ceiling, is necessary. Accurately fitting placement of the joint-sealing element, for example against a profile or a ceiling, is also unnecessary, by virtue of the fixation and fastening of the joint-sealing element during mounting. Mounting is therefore remarkably easy, and the working effort for mounting the joint-sealing element is greatly reduced. By means of the invention, therefore, safe and reliable fireproof sealing of joints between two building parts is achieved, especially between a gypsum board of a drywall studwork and a building part adjoining it, such as a ceiling, wall or floor.

It has been shown that, in the event of fire, the sealing arrangement permits better sealing of the joint between two building parts, especially between a drywall and a connecting building part, such as a wall, a ceiling or a floor, and in this way better and durable sealing against sound and/or smoke as well as better and durable fire protection can be provided, and it can be mounted reliably and free of defects with little working effort.

Furthermore, it has been shown that outstanding imperviousness can be achieved with the inventive joint-sealing element, since good compressibility of the sealing profiles is ensured without additional auxiliary means by the choice of the sealing materials and/or geometric configuration.

By means of the inventive joint-sealing element it is also possible to ensure that, merely by the choice of the sealing materials and/or geometric configuration, sufficient material is installed to ensure excellent imperviousness with maximum absorption of movement.

By means of the inventive joint-sealing element it is further possible to seal irregularities of the surface of a building part safely merely by disposing one building part against another building part, since the sealing profiles of the joint-sealing element are pressed sufficiently firmly against the surface of the one building part and simultaneously against the side faces of the other building part.

In view of the foregoing, it is obvious that the objects of the invention have been solved. Since various modifications can be made to the joint-sealing element described hereinabove, without departing from the scope of the invention, it is intended that all subject matters contained in the foregoing description be interpreted as illustrative and not in a restrictive sense.

The invention claimed is:
1. A joint-sealing element, comprising:
  a carrier,
  a sealing profile made of a material different from a material of the carrier, and having a hollow profile disposed on the carrier, and
  an intumescent material adjacent to and outside of the sealing profile, wherein the disposed sealing profile is configured to seal a joint from the outside of a construction element and comprises an edge attached to said sealing profile in a region of a bond between said carrier and said sealing profile; wherein the joint-sealing element is suitable for fireproof sealing of a joint on a building construction or on a building structure,
  wherein said edge serves for neat positioning and fastening of said joint-sealing element.

2. The joint-sealing element according to claim 1, wherein the sealing profile is disposed on an outer periphery of the carrier.

3. The joint-sealing element according to claim 1, wherein the sealing profile has a round profile or polygonal profile.

4. The joint-sealing element according to claim 1, wherein the sealing profile includes a deformable material.

5. The joint-sealing element according to claim 4, wherein the deformable material is at least one material selected from the group consisting of a slow-burning foam, a plastic, a plastic film, a fabric, or a nonwoven.

6. The joint-sealing element according to claim 1, wherein the carrier includes a plastic, a plastic film, a foam, a fabric, a nonwoven, a metal, or a composite material.

7. The joint-sealing element according to claim 1, wherein the carrier has at least one fastening region oriented in a direction of a longitudinal extent of the joint for fastening of the joint-sealing element on a construction element, disposed peripherally on the joint, of the building construction or of the building structure.

8. The joint-sealing element according to claim 7, wherein the at least one fastening region of the joint-sealing element is textured, perforated or provided with holes.

9. The joint-sealing element according to claim 1, wherein the intumescent material is at least one material selected from the group consisting of an intumescent foam, an intumescent coating or an intumescent strip.

10. The joint-sealing element according to claim 1, wherein said edge is in the form of a filler-guiding edge.

11. A method for fireproof sealing of a joint between two juxtaposed building parts of a building construction or of a building structure with at least one first building part, one second building part and a joint-sealing element according to claim 1, said method comprising:
  in a first step, positioning the joint-sealing element on an end edge of the first building part and,
  in a second step, fastening the joint-sealing element.

12. The method according to claim 11, wherein the first step comprises positioning by at least one positioning technique selected from the group consisting of adhesives, nails, screws, clamps and/or dowels.

13. The method according to claim 11, wherein the second step comprises fastening by filling.

14. A sealing arrangement for sealing a joint between two juxtaposed building parts of a building construction or of a building structure with at least one first building part, one second building part and a joint-sealing element according to claim 1, said sealing arrangement comprising:
  the sealing profile is positioned in the outer region of the joint, and is configured to seal the joint from the outside.

15. The sealing arrangement according to claim 14, wherein the carrier of the joint-sealing element is disposed on the periphery of the first building part.

16. The sealing arrangement according to claim 14, wherein the carrier of the joint-sealing element is disposed on the upper end edge of the outside of the first building part.

17. The sealing arrangement according to claim 14, wherein the first building part is a drywall and the second building part is selected from the group consisting of a wall, a ceiling or a floor of a building construction or of a building structure.

\* \* \* \* \*